(12) United States Patent
Macfarlane et al.

(10) Patent No.: US 9,988,954 B2
(45) Date of Patent: Jun. 5, 2018

(54) SYSTEM AND METHOD FOR REDUCING ENGINE OIL DILUTION

(71) Applicant: Ford Global Technologies, LLC, Dearborn, MI (US)

(72) Inventors: Kevin Macfarlane, Northville, MI (US); Dennis Witt, Chelmsford (GB); Amanda Perkins, Belleville, MI (US); Christopher Semanson, Southfield, MI (US); Robert Milton, Livonia, MI (US); Charles Irwin Rackmil, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/199,410

(22) Filed: Jun. 30, 2016

(65) Prior Publication Data
US 2018/0003092 A1    Jan. 4, 2018

(51) Int. Cl.
| | |
|---|---|
| *F01M 11/10* | (2006.01) |
| *G01N 33/28* | (2006.01) |
| *F01M 1/16* | (2006.01) |
| *F02D 41/40* | (2006.01) |
| *F01M 1/10* | (2006.01) |

(52) U.S. Cl.
CPC ............ *F01M 1/16* (2013.01); *F01M 1/10* (2013.01); *F02D 41/401* (2013.01); *F01M 2001/1007* (2013.01); *F01M 2001/165* (2013.01); *F01M 2011/14* (2013.01); *F01M 2250/66* (2013.01)

(58) Field of Classification Search
CPC .. F01M 1/16; F01M 1/10; F01M 1/18; F01M 11/10; F01M 2230/02; F01M 2250/66; F01M 2001/165; F01M 2001/1007; F01M 2011/1473; F01M 2011/1486; F01M 2011/14; F01M 2011/1426; F01M 2011/142; F02D 41/401; F02D 2250/11; G07C 5/085; G07C 5/0808; G07C 5/0841; G01N 21/3577; G01N 21/359; G01N 33/2888; G01N 33/2876
See application file for complete search history.

(56) References Cited

U.S. PATENT DOCUMENTS

| | | | |
|---|---|---|---|
| 4,525,782 A | 6/1985 | Wohlfarth et al. | |
| 4,694,793 A | 9/1987 | Kawakita et al. | |
| 4,742,476 A * | 5/1988 | Schwartz | F01M 11/10 123/196 S |
| 5,382,942 A * | 1/1995 | Raffa | F01M 11/10 340/438 |

(Continued)

FOREIGN PATENT DOCUMENTS

EP    1900912 A2    8/2007

*Primary Examiner* — Lindsay Low
*Assistant Examiner* — George Jin
(74) *Attorney, Agent, or Firm* — Julia Voutyras; McCoy Russell LLP

(57) ABSTRACT

Methods and systems are provided for filtering an oil dilution amount based on a current value of the oil dilution amount. In one example, filtering the oil dilution amount may include decreasing a sensitivity of filtering at lower oil dilution below a threshold; otherwise, increasing the sensitivity of filtering. The sensitivity of the filtering may be decreased by implementing a larger time constant, while the sensitivity of the filtering may be increased by implementing a smaller time constant.

19 Claims, 7 Drawing Sheets

(56) References Cited

U.S. PATENT DOCUMENTS

| | | | |
|---|---|---|---|
| 6,266,587 B1 | 7/2001 | Guertler et al. | |
| 6,484,127 B1* | 11/2002 | Langervik | F01M 11/10 |
| | | | 340/451 |
| 2005/0268884 A1* | 12/2005 | Yokoyama | F02D 41/0027 |
| | | | 123/299 |
| 2006/0229776 A1* | 10/2006 | Lvovich | G01N 33/2888 |
| | | | 324/698 |
| 2008/0154478 A1* | 6/2008 | Lyons | F01M 1/18 |
| | | | 701/102 |
| 2010/0180671 A1* | 7/2010 | Okuyama | F01M 1/18 |
| | | | 73/53.05 |
| 2012/0044077 A1 | 2/2012 | Blossfeld et al. | |
| 2012/0209460 A1* | 8/2012 | Jacques | F01M 11/10 |
| | | | 701/22 |
| 2013/0131912 A1* | 5/2013 | Chen | G07C 5/006 |
| | | | 701/29.5 |

\* cited by examiner

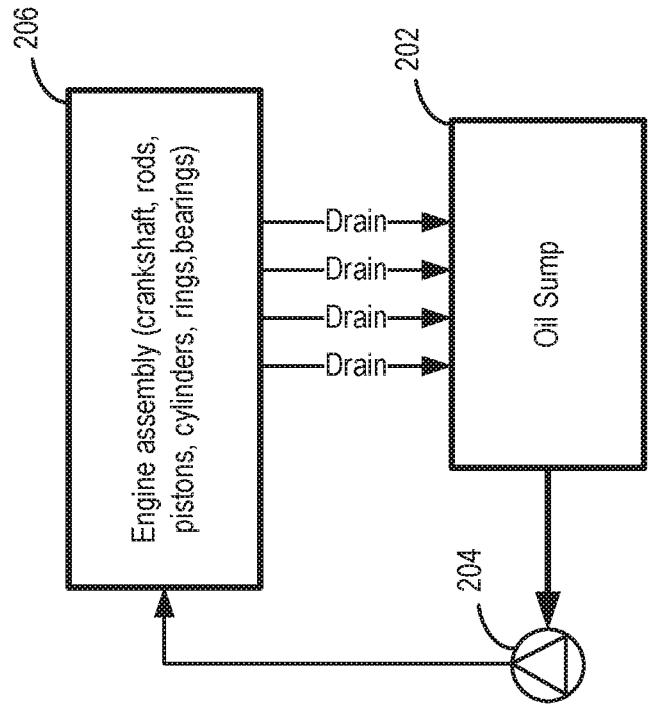

SYSTEM AND METHOD FOR REDUCING ENGINE OIL DILUTION

FIELD

The present disclosure relates to systems and methods for engine oil dilution.

BACKGROUND AND SUMMARY

An oil change interval for a vehicle may provide an indication of distance or duration of vehicle operation until next oil change. The oil change interval may be based on degradation of engine oil, which may occur due to one or more factors including fuel dilution of engine oil. For example, during cold engine operation, if the engine does not reach stable engine operating conditions, fuel dilution of the engine oil can occur. For example, fuel may mix with engine oil in an engine's crankcase. Repeated cold start engine operation without completing engine warm-up may result in excessive fuel dilution and degradation of oil quality. Further, the engine may be operated with late fuel injection timing in order to reduce particulate matter emissions, which may increase oil dilution, especially during repeated cold engine starts before the engine has warmed up. Further still, in vehicle systems equipped with a diesel particulate filter (DPF), post fuel injections may be performed to increase an exhaust temperature for regeneration of the DPF. During post fuel injections, some of the post-injected fuel may deposit onto the cylinder wall and drain into an oil pan, which may increase fuel dilution of the engine oil.

However, fuel dilution of engine oil may vary based on the driving style. For example, highway driving may facilitate evaporation of lighter fraction of fuel in oil, thereby decreasing fuel dilution of engine oil. The variations in fuel dilution of engine oil may cause significant variations in the oil change interval, which is less desirable, in particular, when the oil change interval is displayed to a customer. Further, based on the oil dilution amount one or more adjustments to engine operating conditions, such as increasing engine temperature and injecting fuel early, may be performed to mitigate oil dilution. Thus, a transient increase in oil dilution amount may cause an engine controller to take unnecessary actions to mitigate oil dilution, which may influence fuel economy and emissions. For example, increasing engine temperature may reduce fuel economy and adapting early fuel injection timings may increase particulate emissions. On the other hand, a transient decrease in oil dilution amount may increase the oil change interval and thus, cause a delay in informing the customer regarding the need to change oil immediately.

In one example, the issues described above may be addressed by a method for a vehicle engine, comprising: determining a filtered oil dilution amount by filtering an estimated oil dilution amount of an engine oil; and indicating oil degradation based on the filtered oil dilution amount; wherein an amount of filtering is adjusted based on the estimated oil dilution amount. In this way, the estimated oil dilution data may be filtered based on the estimated oil dilution. Specifically, the filtering may be adjusted to filter out transient dynamics at lower dilutions while increasing sensitivity to variations at higher dilutions.

In one example, when the estimated oil dilution amount is less than a threshold amount, a larger time constant may be implemented for the filter; otherwise, a smaller time constant may be implemented. Further, a current service interval (that is distance and/or time remaining until next oil change) may be determined based on the filtered oil dilution amount. Further, responsive to the filtered output increasing above a higher threshold, an indication may be provided to a user to change oil. By choosing the larger time constant, transient dynamics in oil dilution amounts may be filtered out at lower oil dilution. Therefore, the current service interval is displayed to the user, transient degradation dynamics are filtered out. However, when the estimated oil dilution amount is at or greater than the threshold, by choosing a smaller time constant, the filtered output may closely follow changes in the oil dilution amount. The smaller time constant increases the sensitivity of the filter and improves a filter response time. Therefore, latency in delivering the filtered output is reduced and the user may be informed of the need to change oil in a timely manner when the filtered output reaches the higher threshold dilution.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2 schematically depicts flow of oil in a lubrication system of the engine.

DETAILED DESCRIPTION

Figure 1:
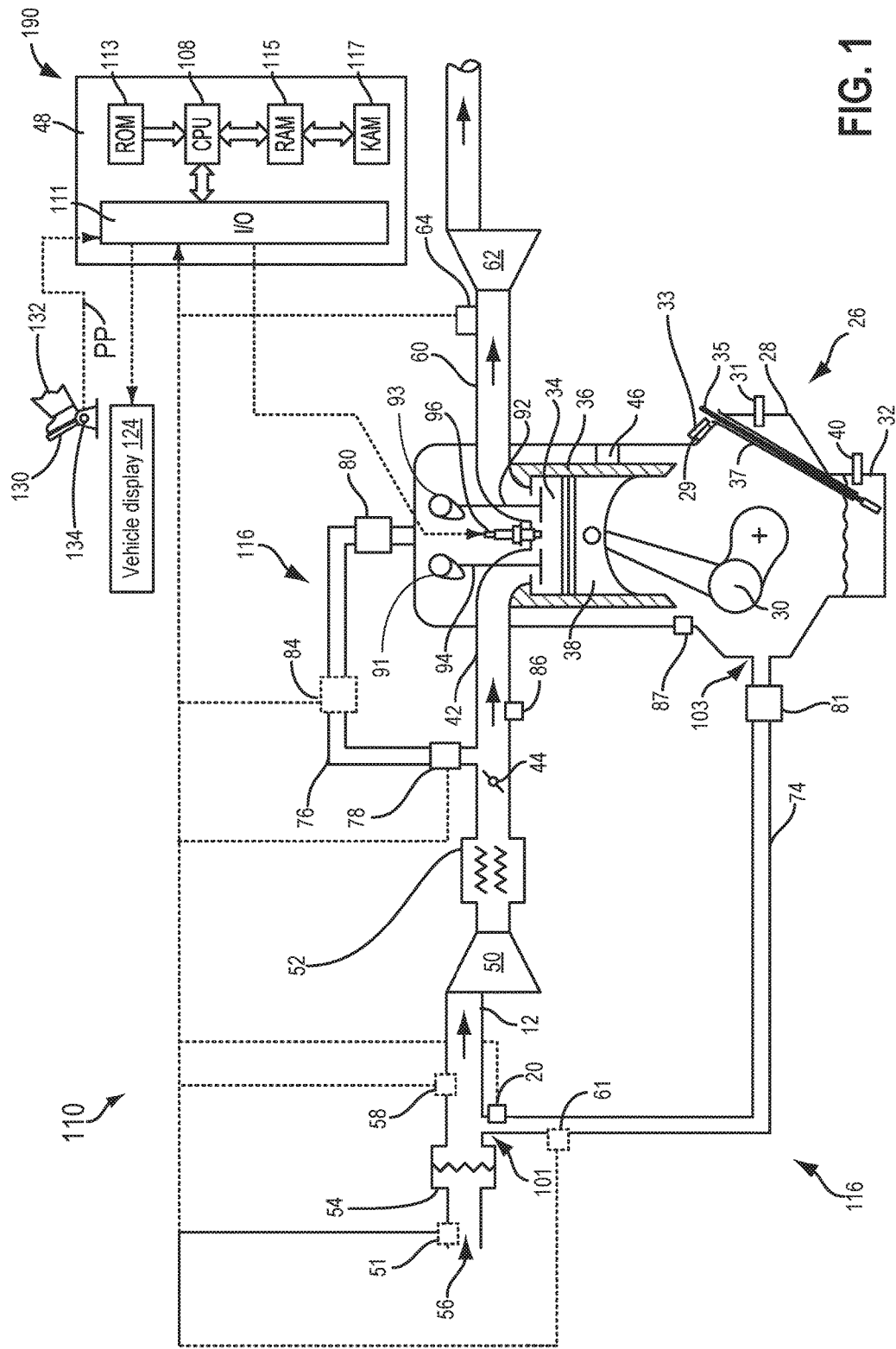
FIG. 1 illustrates an example of an engine with a positive crankcase ventilation (PCV) system.
Figure 5:
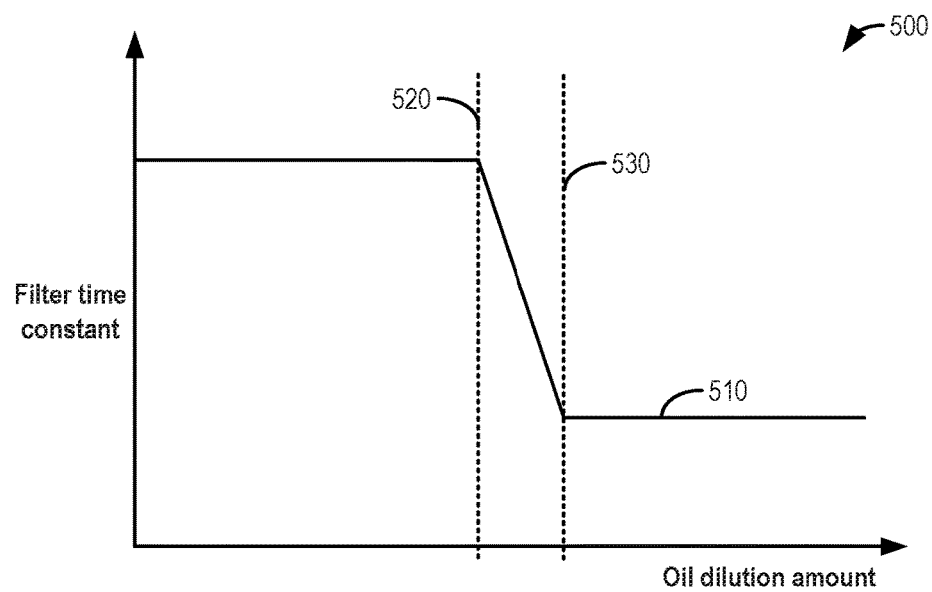
FIG. 5 shows an example selection of filter time constant for filtering an estimated oil dilution amount.
Figure 6:
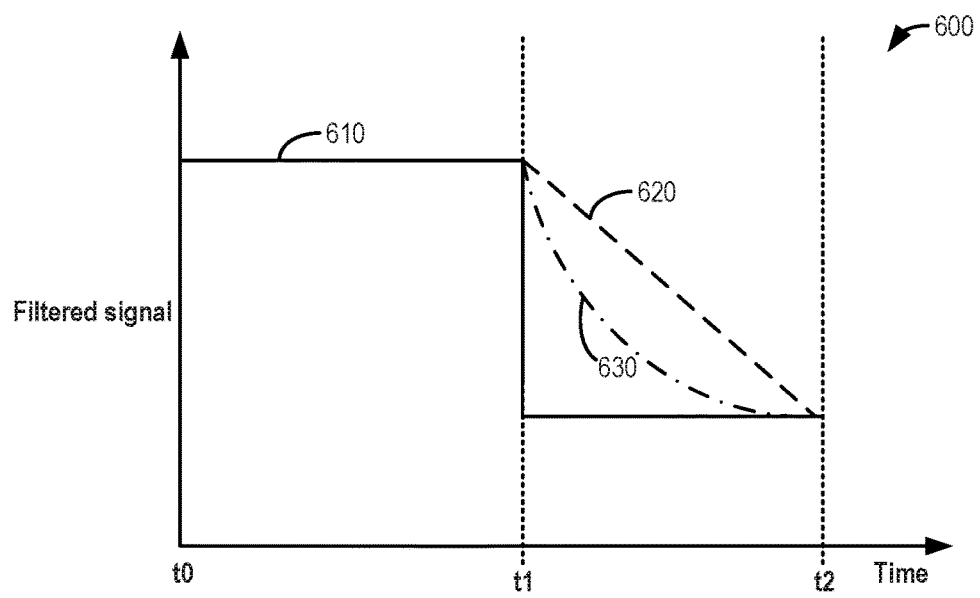
FIG. 6 shows an example filter response based on a filter time constant.
Figure 7:
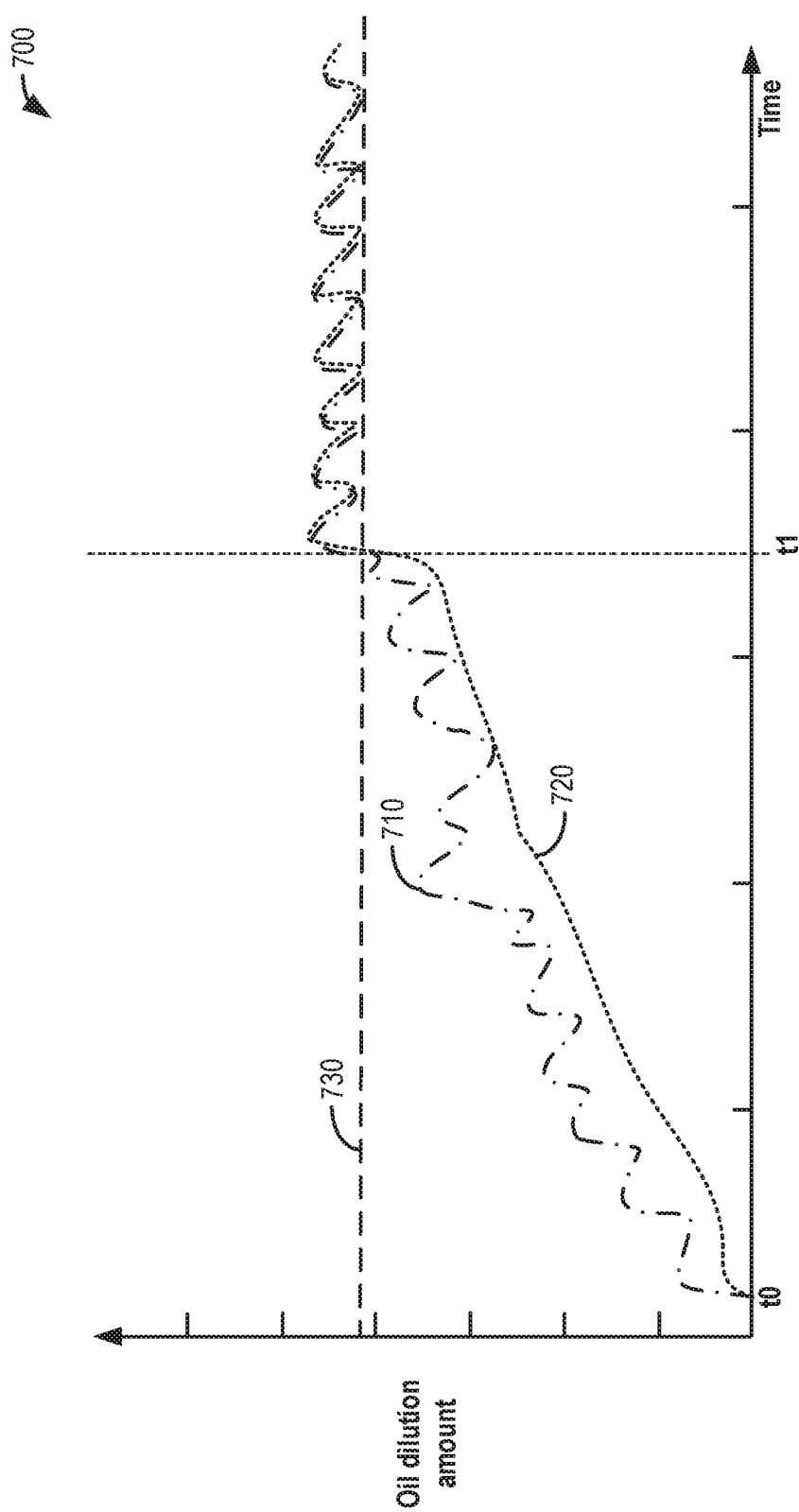
FIG. 7 shows an example change in filtered oil dilution amount based on a filter time constant according to the present disclosure.

The following description relates to systems and methods for filtering an oil dilution amount based on the oil dilution amount in an engine system, such as the engine system of FIG. 1. Oil flow in a lubrication system of the engine system of FIG. 1 is shown at FIG. 2. An engine controller may perform a control routine, such as the routine of FIG. 3A, to determine an oil dilution amount, filter the oil dilution amount, estimate oil degradation based on the filtered oil dilution amount, and estimate a current service interval based on the estimated oil degradation. Filtering the oil dilution amount may be performed as shown in FIG. 3B. Specifically, the controller may adjust one or more parameters of a filter based on the oil dilution amount. For example, when the oil dilution amount is less than a threshold, a filter time constant may be adjusted to a larger value to filter out transient variations in oil dilution estimations. Further, when the oil dilution amount is at or above the threshold, the filter constant may be adjusted to a smaller value in order to improve filter response and follow the estimated oil dilution input more closely. The smaller filter time constant may enable the controller to detect when the oil dilution increases above a higher threshold and trigger a message to provide an indication to a user to change oil. The controller may be further configured to perform a control routine, such as control routine of FIG. 4, to update a current service interval and display the current service interval based on a user input. An example determination of a filter time constant based on the oil dilution amount is shown at FIG. 5. An example decay of the filter based on the filter constant is illustrated at FIG. 6. An example filtered oil dilution signal is shown at FIG. 7.

FIG. 1 shows an example configuration of a multi-cylinder engine generally depicted at 110, which may be included in a propulsion system of an automobile. Engine 110 may be controlled at least partially by a control system 190 of the vehicle including a controller 48 and by input from a vehicle operator 132 via an input device 130. In this example, input device 130 includes an accelerator pedal and a pedal position sensor 134 for generating a proportional pedal position signal PP.

Engine 110 may include a lower portion of the engine block, indicated generally at 26, which may include a crankshaft 30. Crankcase 28 may include an oil sump 32, otherwise referred to as an oil well, holding engine lubricant (e.g., oil) positioned below the crankshaft 30. During some conditions, fuel may enter crankcase 28 via engine cylinders, for example. An oil fill port 29 may be disposed in crankcase 28 so that oil may be supplied to oil sump 32. Oil fill port 29 may include an oil cap 33 to seal oil port 29 when the engine is in operation. A dip stick tube 37 may also be disposed in crankcase 28 and may include a dipstick 35 for measuring a level of oil in oil sump 32. Additionally or alternatively, an oil level sensor 40 may be positioned within the crankcase to detect a level of oil in oil sump 32. Oil level sensor 40 may provide an indication of oil level to controller 48. In one example, oil level sensor 40 may be a pneumatic sensor. However, it will be appreciated that oil level sensor 40 may be any other type of sensor, such as an ultrasonic sensor, suitable for sensing levels of viscous fluids.

Based on the indication of oil level from the oil level sensor, controller 48 may output a signal indicating an oil level state. The oil level state may be any one of a first state indicating an oil level above maximum, a second state indicating oil level within upper and lower threshold, a third state indicating an oil level below lower threshold, and a fourth state indicating an oil level below a second lower threshold. Based on the oil level state, controller 48 may output an indication, such as a text message and/or a graphical image (e.g., telltale) indicating a desired vehicle operator action to be displayed to vehicle operator 132 via a display 124. The indication may be displayed as a pop-up and may be clearable by the customer. Additionally or alternatively, the indication may be displayed in response to a customer request, via an on-demand menu, for example. In some examples, when the oil level is above maximum, or below the lower threshold or below the second lower threshold, the indication may be displayed at each vehicle engine start-up. The display 124 may be an example of a human—machine interface (HMI). Example oil level states and corresponding indications are shown below at table 1.

TABLE 1

| Oil level State | Message Text | Display type/ Persistence | Graphical image indicated? | Persistence of graphical image |
| --- | --- | --- | --- | --- |
| Oil level above maximum | Check engine oil, level above maximum | Pop-up/ clearable by customer | Yes | Permanent until corrected by customer |
| Oil level within upper and lower threshold | None | None | No | None |
| Oil level below lower threshold | Check engine oil, level very low | Pop-up/ clearable by customer | Yes | Permanent until corrected by customer |
| Oil level below second lower threshold | Change engine oil soon | Pop-up/ clearable by customer | Yes | Permanent until corrected by customer |

Further, crankcase 28 may include a viscosity sensor (not shown) for providing an indication of dilution of oil and an oil temperature sensor (not shown) for providing an indication of an engine oil temperature. The indications from the viscosity sensor and/or the oil temperature sensor may be utilized by a controller 48 to estimate an amount of degradation of engine oil. In addition, crankcase 28 may include a plurality of other orifices for servicing components in crankcase 28. These orifices in crankcase 28 may be maintained closed during engine operation so that a crankcase ventilation system (described below) may operate during engine operation. Further, crankcase 28 may include an air-to-fuel ratio sensor 31 for sensing an air-to-fuel ratio in a positive crankcase ventilation (PCV) system 116.

The upper portion of engine block 26 may include a combustion chamber (e.g., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors (not shown) and intake air from intake manifold 42 which is positioned downstream of throttle 44. The engine block 26 may also include an engine coolant temperature (ECT) sensor 46 input into a controller 48 (described in more detail below herein).

A throttle 44 may be disposed in the engine intake to control the airflow entering intake manifold 42 and may be preceded upstream by compressor 50 followed by charge air cooler 52, for example. Compressor 50 may compress the intake air to engine 110, thereby boosting intake air pressure and density providing boosted engine conditions (e.g., manifold air pressure>barometric pressure), for example during increased engine loads. An air filter 54 may be positioned upstream compressor 50 and may filter fresh air entering intake passage 56.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it, and turbine 62 may be driven by the flow of exhaust gases passing there through. Furthermore, turbine 62 may be mechanically coupled to compressor 50 via a common shaft (not shown), such that rotation of turbine 62 may drive compressor 50. Sensor 64 may be a suitable sensor for providing an indication of engine air-to-fuel ratio from exhaust gas constituents. For example, sensor 64 may be a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be in electrical communication with controller 48. As discussed herein, the engine air-to-fuel ratio may be utilized to estimate an oil dilution amount.

An exhaust gas treatment system (not shown) including an exhaust gas treatment device (not shown) may be arranged along exhaust passage 60 downstream of turbine 62. In the example, the exhaust gas treatment system may be a selective catalytic reduction system, and the exhaust gas treatment device may be a selective catalyst reduction (SCR) catalyst. In other examples, the exhaust gas treatment system may additionally or alternatively include a three-way catalyst (TWC), a $NO_x$ trap, various other emission control devices, or combinations thereof. In some examples, additionally a particulate filter (e.g., a diesel particulate filter) may be arranged downstream of the exhaust gas treatment device. In exhaust systems including the particulate filter, post fuel injections may be performed to increase an exhaust temperature for regeneration of the particulate filter. During post fuel injections, some of the post-injected fuel may deposit onto the cylinder wall and drain into an oil pan, which may increase fuel dilution of the engine oil. Therefore, based on a number of regeneration events of the particulate filter, an oil dilution amount may be estimated. For example, controller 48 may utilize a counter that tracks the number of regeneration events of the particulate filter, and as the number of regeneration events increase, the estimated oil dilution amount may also increase. In some examples, additionally, the estimation of oil dilution amount may take into account a driving style (e.g., highway driving, city driving, etc.) and fuel consumption (e.g., mileage).

While the above-mentioned method of estimating oil dilution is based on the number of DPF regeneration events, it will be appreciated that the oil dilution amount may be estimated in a variety of ways (e.g., based on an indication from an oil viscosity sensor, air-fuel ratios, etc.) as discussed further below in the description of FIG. 1 and with respect to FIG. 3A.

In the example of FIG. 1, a positive crankcase ventilation system (PCV) 116 is coupled to a fresh air intake 12 of an engine 110 so that gases in the crankcase 28 may be vented in a controlled manner.

Engine 110 includes combustion chamber (cylinder) 34 and cylinder walls 36 with piston 38 positioned therein and connected to crankshaft 30. Combustion chamber 34 is shown communicating with intake manifold 42 and exhaust manifold 60 via respective intake valve 94 and exhaust valve 92. Each intake and exhaust valve may be operated by an intake cam 91 and an exhaust cam 93. The opening and closing time of exhaust valve 92 may be adjusted relative to crankshaft position via an exhaust cam phaser (not shown). The opening and closing time of intake valve 94 may be adjusted relative to crankshaft position via an intake cam phaser (not shown). The position of intake cam 91 may be determined by an intake cam sensor (not shown). The position of exhaust cam 93 may be determined by exhaust cam sensor (not shown). In this way, controller 48 may control the cam timing through phasers. Variable cam timing (VCT) may be either advanced or retarded, depending on various factors such as engine load and engine speed (RPM).

During normal engine operation, gases in the combustion chamber 34 may escape past the piston. These blow-by gases may include un-combusted fuel, combustion products, and air. Blow-by gases can dilute and contaminate oil, causing corrosion to engine components and contributing to sludge build-up, reducing the protective and lubricating properties of the oil. At higher engine speeds, blow-by gases can increase crankcase pressure such that oil leakage may occur from sealed engine surfaces. The PCV system 116 may help to vent and remove blow-by gases from the engine crankcase in a controlled manner in order to mitigate these undesirable effects of blow-by gases and may combine them with an engine intake stream so that they may be combusted within the engine. By redirecting blow-by gases to the engine intake, the PCV system 116 further aids in reducing engine emissions by precluding venting of blow-by gases to the atmosphere.

The PCV system 116 includes a PCV valve 78 in communication with engine crankcase 28. As an example, the PCV valve 78 may be mechanically coupled to a valve cover in the engine, which may allow for the PCV system to draw blow-by gases from the engine while reducing the entrainment of oil from the crankcase. The PCV valve 78 may also be in fluidic communication with the engine intake manifold 42. The PCV valve gas flow rate may vary with engine conditions such as engine speed and load, and the PCV valve 78 may be calibrated for a particular engine application wherein the PCV valve gas flow rate may be adjusted as operating conditions change. As an example, when the engine is off, the PCV valve may be closed and no gases may flow through the PCV valve 78. When the engine speed is idling or low, or during deceleration when the intake manifold vacuum is relatively high, the PCV valve 78 may open slightly, allowing for restricted PCV valve gas flow rates. At engine speeds or loads higher than at idle conditions, intake manifold vacuum may lower, and the PCV valve 78 may allow for higher PCV valve gas flow rates. PCV valve 78 may include a conventional PCV valve or a push-pull type PCV valve.

During non-boosted conditions (when intake manifold pressure (MAP) is less than barometric pressure (BP)), the PCV system 116 draws air into crankcase 28 via a breather or crankcase ventilation (vent) tube 74. A first end 101 of crankcase ventilation tube 74 may be mechanically coupled, or connected, to fresh air intake 12 upstream of compressor 50. In some examples, the first end 101 of crankcase ventilation tube 74 may be mechanically coupled to fresh air intake 12 downstream of air filter 54 (as shown). In other examples, the crankcase ventilation tube may be mechanically coupled to fresh air intake 12 upstream of air filter 54. In yet another example, the crankcase ventilation tube may be mechanically coupled to air filter 54. A second end 103, opposite first end 101, of crankcase ventilation tube 74 may be mechanically coupled, or connected, to crankcase 28 via an oil separator 81.

In some examples, crankcase ventilation tube 74 may include a pressure sensor 61 coupled therein. Pressure sensor 61 may be an absolute pressure sensor or a gauge sensor. One or more additional pressure and/or flow sensors may be coupled to the PCV system 116 at alternate locations. For example, a barometric pressure sensor (BP sensor) 51 may be coupled to intake passage 56, upstream of air filter 54, for providing an estimate of barometric pressure (BP). In one example, where pressure sensor 61 is configured as a gauge sensor, BP sensor 51 may be used in conjunction with pressure sensor 61. In some examples, a compressor inlet pressure (CIP) sensor 58 may be coupled in intake passage 56 downstream of air filter 54 and upstream of compressor 50 to provide an estimate of the compressor inlet pressure (CIP). A PCV system air-to-fuel ratio (AFR) sensor 31 may be disposed in crankcase 28 to measure a PCV system air-to-fuel ratio. AFR sensor 31 may be an oxygen sensor, for example. In some examples, AFR sensor 31 may be located in crankcase ventilation tube 74 and/or conduit 76.

During non-boosted conditions, the PCV system 116 vents air out of the crankcase and into intake manifold 42 via conduit 76 which, in some examples, may include a one-way PCV valve 78 to provide continual evacuation of gases from inside the crankcase 28 before connecting to the intake manifold 42. In one example, the PCV valve 78 may vary its flow restriction in response to the pressure drop across it (or flow rate through it). However, in other examples conduit 76 may not include a one-way PCV valve. In still other examples, the PCV valve may be an electronically controlled valve that is controlled by controller 48. It will be appreciated that, as used herein, PCV flow refers to the flow of gases through conduit 76 from the crankcase to the intake manifold 42. As an example, the PCV flow may be determined from the fuel (e.g., gaseous fuel) injection rate, the air/fuel ratio in the engine intake, and the exhaust oxygen content via exhaust gas sensor 64, using known methods.

PCV backflow may occur when intake manifold pressure is higher than crankcase pressure (e.g., during boosted engine operation). PCV backflow refers to the flow of gases through conduit 76 from the intake manifold 42 to the crankcase 28. In some examples, PCV system 116 may be equipped with a check valve for preventing PCV backflow. It will be appreciated that while the depicted example shows PCV valve 78 as a passive valve, this is not meant to be limiting, and in alternate examples, PCV valve 78 may be an electronically controlled valve (e.g., a powertrain control module (PCM) controlled valve) wherein a controller 48 of control system 190 may command a signal to change a position of the valve from an open position (or a position of high flow) to a closed position (or a position of low flow), or vice versa, or any position there-between.

During boosted conditions (when MAP is greater than BP), gases flow from the crankcase, through oil separator 81 and into fresh air intake 12 and eventually into the combustion chamber 34. This may be done in a stale air manner where no intake manifold air is let into the crankcase 28 or in a positive crankcase ventilation manner where some manifold air is metered into the crankcase 28.

While the engine is running under light load and moderate throttle opening, the intake manifold air pressure may be less than crankcase air pressure. The lower pressure of the intake manifold 42 draws fresh air towards it, pulling air from the crankcase ventilation tube 74 through the crankcase (where it dilutes and mixes with combustion gases), out of the crankcase via the PCV conduit 76 through the PCV valve 78, and into the intake manifold 42. However, during other conditions, such as heavy load or under boosted conditions, the intake manifold air pressure may be greater than crankcase air pressure. As such, intake air may travel through the PCV conduit 76 and into the crankcase 28.

The gases in crankcase 28 may include un-combusted fuel, un-combusted air, and fully or partially combusted gases. Further, lubricant mist may also be present. As such, various oil separators may be incorporated in positive PCV system 116 to reduce exiting of the oil mist from the crankcase 28 through the PCV system 116. For example, conduit 76 may include a uni-directional oil separator 80 which filters oil from vapors exiting crankcase 28 before they re-enter the intake manifold 42. Another oil separator 81 may be disposed in crankcase ventilation tube 74 to remove oil from the stream of gases exiting the crankcases during boosted operation. Additionally, in some examples, conduit 76 may also include a vacuum sensor 84 coupled to the PCV system 116.

Controller 48 is shown in FIG. 1 as a microcomputer, including microprocessor unit 108, input/output device 111, an electronic storage medium for executable programs and calibration values shown as read only memory chip 113 in this particular example, random access memory 115, keep alive memory 117, and a data bus. Controller 48 may receive various signals from various sensors 119 coupled to engine 110, engine coolant temperature (ECT) from temperature sensor 46; a measurement of intake manifold pressure (MAP) from pressure sensor 86; an indication of oil level from oil level sensor 40, an indication of oil dilution from the viscosity sensor, an indication of oil temperature from the oil temperature sensor, a measurement of crankcase pressure from pressure sensor 87, a measurement of barometric pressure from BP sensor 51, exhaust gas air/fuel ratio from exhaust gas sensor 64, PCV air-to-fuel ratio from sensor 31, an indication of vehicle speed from a vehicle speed sensor coupled to the vehicle, an indication of fuel consumption from a fuel usage sensor coupled to the vehicle, and other sensors described below. Storage medium read-only memory 113 can be programmed with computer readable data representing instructions executable by processor 108 for performing the methods described below, as well as other variants that are anticipated but not specifically listed. Controller 48 may be configured to perform one or more routines. For example, controller 48 may be configured to estimate an oil dilution amount in a variety of ways. For example, oil dilution amount may be based on air-fuel ratios sampled at various portions of an engine start and warm-up. Further, it may be based the sensor measuring oil quantities, such as viscosity. Still other approaches may also be used, such as integrating a difference between a commanded air-to-fuel ratio and an engine air-to-fuel ratio. In some examples, oil dilution estimations may take into account a number of DPF regeneration events and a driving style (e.g., vehicle speed, mileage, vehicle load etc.).

Upon estimating the oil dilution amount, controller 48 may filter the estimated oil dilution data. Further, one or more parameters of the filter including a time constant and a period between two sample inputs for the filter may be adjusted based on the estimated oil dilution amount. For example, responsive to the estimated oil dilution amount less than a threshold, a larger filter constant may be implemented for the filter; otherwise, a smaller filter time constant may be implemented. By utilizing the larger filter time constant at lower oil dilution, transient degradation dynamics of the estimated oil dilution amount may be filtered out. However, at higher oil dilution, a smaller time constant may be implemented to increase sensitivity of the filter and reduce latencies. The filtered oil dilution output along with one or more parameters such as a vehicle speed, mileage, amount soot in oil, and engine oil temperature may be utilized to estimate oil wear (also referred to as oil degradation). Example control routines for estimating oil dilution, filtering the oil dilution amount and estimating oil wear will be further elaborated with respect to FIGS. 3A, 3B, and 4.

Controller 48 may send signals to a communications system, such as a wireless network or controller area network (CAN). For example, after determining oil wear (also referred to herein as oil degradation) based on fuel in oil amount, driving style, and soot in oil amount, controller 48 may determine an oil wear parameter. The oil wear parameter may include one or more of a current service interval (distance or duration remaining until next oil change), and a remaining lifetime of the engine oil. Upon determining the oil wear parameter, the controller may send a message to the communications system to notify the operator of the vehicle via display 124. The notification may be a text message such as "change oil now" or "change oil soon". The type of message may be based on the oil wear parameter. For example, if the service interval is near a threshold interval, the message may include "change oil soon". However, if the service interval is at the threshold interval, the message may include "change oil now" or "oil change required".

In one example, in response to a user request (e.g., via an on-demand menu), the oil wear parameter (that is, the current service interval and/or remaining life of engine oil) may be displayed on a vehicle display 124 in addition to the notification, such as a dashboard or other vehicle display. In another example, the communications system may send a message regarding the oil wear parameter or the notification to a mobile device of the operator in the form of a text message, for example, or to a personal computer in the form of an email. Yet another example, the communications system may additionally or alternatively send a message to a third party, such as a service center regarding the current service interval. The service center may utilize the received information for more efficient scheduling of servicing of engine oil, for example.

Fuel injector 96 is shown coupled directly to combustion chamber 34 for injecting fuel directly therein in proportion to the pulse width of signal FPW received from controller 48 via electronic driver (not shown). In this manner, fuel injector 96 provides what is known as direct injection of fuel into combustion chamber 34. The fuel injector may be mounted in the side of the combustion chamber or in the top of the combustion chamber, for example. Fuel may be delivered to fuel injector 66 by a fuel system (not shown in FIG. 1) including a fuel tank, a fuel pump, and a fuel rail. The fuel tank may store one or more liquid fuels, including but not limited to: gasoline, diesel, and alcohol fuels. In some examples, the fuel may be stored on-board the vehicle as a blend of two or more different fuels.

In some examples, combustion chamber 34 may alternatively or additionally include a fuel injector arranged in the intake in a configuration that provides what is known as port injection of fuel into the intake port upstream of combustion chamber 34.

During engine operation, each cylinder within engine 110 typically undergoes a four stroke cycle: the cycle includes the intake stroke, compression stroke, expansion stroke, and exhaust stroke. During the intake stroke, generally, the exhaust valve 92 closes and intake valve 94 opens. Air is introduced into combustion chamber 34 via intake manifold 42, and piston 38 moves to the bottom of the cylinder so as to increase the volume within combustion chamber 34. The position at which piston 38 is near the bottom of the cylinder and at the end of its stroke (e.g., when combustion chamber 34 is at its largest volume) is typically referred to by those of skill in the art as bottom dead center (BDC). During the compression stroke, intake valve 94 and exhaust valve 92 are closed. Piston 38 moves toward the cylinder head so as to compress the air within combustion chamber 34. The point at which piston 38 is at the end of its stroke and closest to the cylinder head (e.g., when combustion chamber 34 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as igni- tion, the injected fuel is ignited by compression ignition or by known ignition means such as spark plug (not shown), resulting in combustion. During the expansion stroke, the expanding gases push piston 38 back to BDC. Crankshaft 30 converts piston movement into a rotational torque of the rotary shaft. Finally, during the exhaust stroke, the exhaust valve 92 opens to release the combusted air-fuel mixture to exhaust manifold 60 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

In one example, the fuel injection timing may be adjusted based on the filtered oil dilution amount. Adjusting fuel injection may include advancing a timing of initiation of fuel injection during a cylinder cycle based on the filtered oil dilution amount. The oil dilution amount may be estimated based on an ambient temperature, an engine block temperature, an engine coolant temperature, an engine speed, an engine load, a fuel injection pressure, a fuel injection timing, an engine operation time, a commanded air-to-fuel ratio, and an engine air-to-fuel ratio, for example. Details of estimating the oil dilution amount will be elaborated with respect to FIG. 3A. The estimated oil dilution amount may be subsequently filtered, and the fuel injection timing may be adjusted based on the filtered oil dilution amount. As an example, during cold start conditions, when the filtered oil dilution amount is greater than a threshold amount, a timing of initiation of fuel injection may be advanced (in other words, initiation of fuel injection may occur earlier) in a cylinder cycle, with respect to a base timing of initiation of fuel injection that may be utilized when the filtered oil dilution amount is less than the threshold amount. In this way, fuel injection may be advanced when a (filtered) oil dilution amount is greater than threshold. Advancing fuel injection may increase atomization and vaporization of fuel for improved mixing of fuel with cylinder air charge. As a result, combustion efficiency may be improved, and more fuel may be combusted. Consequently, amount of fuel droplets coating the cylinder walls and escaping through piston rings into the crankcase during a combustion cycle may be reduced. As a result, dilution of oil with fuel may be reduced. Further, exhaust gas emissions may be reduced. In some examples, a valve opening timing and/or fuel injection timing may be adjusted to improve vaporization and atomization of fuel in the cylinder, and consequently, reduce oil dilution.

FIG. 2 is a simplified schematic showing the flow of oil in a vehicle's lubrication system. Oil is pumped from the oil sump (202) by an oil pump (204) to lubricate many of the moving parts of the engine assembly (206) such as the crankshaft 30 at FIG. 1 and its connecting rods, and bearings in the connecting rods and pins of the pistons, such as piston 38 at FIG. 1. Oil is also used for lubrication between the rings of the engine piston and the engine cylinders (e.g., engine cylinder 34 at FIG. 1), forming a sliding oil film seal, and preventing leakage of the fuel/air mixture and exhaust from the combustion chamber into the oil sump during compression and combustion. The thickness and effectiveness of this oil film seal is dependent on the oil temperature and properties such as oil viscosity. After reaching the moving parts of the engine, the oil drains back to the sump.

As discussed herein, oil may be diluted with fuel during engine operation. For example, oil dilution with fuel may increase when late fuel injections are performed. As such, late fuel injections may be utilized to reduce particulate matter and particle number emissions. However, during late fuel injections, fuel may seep through the piston rings due to high cylinder pressures and contaminate the oil in the crankcase. Consequently, start of injection timing may be adjusted to trade particulate emissions for oil dilution or vise-versa. Oil dilution may be monitored based on based on an ambient temperature, an engine block temperature, an engine coolant temperature, an engine speed, an engine load, a fuel injection pressure, a fuel injection timing, an engine operation time, a commanded air-to-fuel ratio, and an engine air-to-fuel ratio as described with respect to FIG. 3A. Based on the oil dilution amount, an amount of filtering applied to filter the estimated oil dilution amount may be adjusted. Details of adjusting the filtering will be further elaborated with respect to FIGS. 3A-7.

Figure 3A:
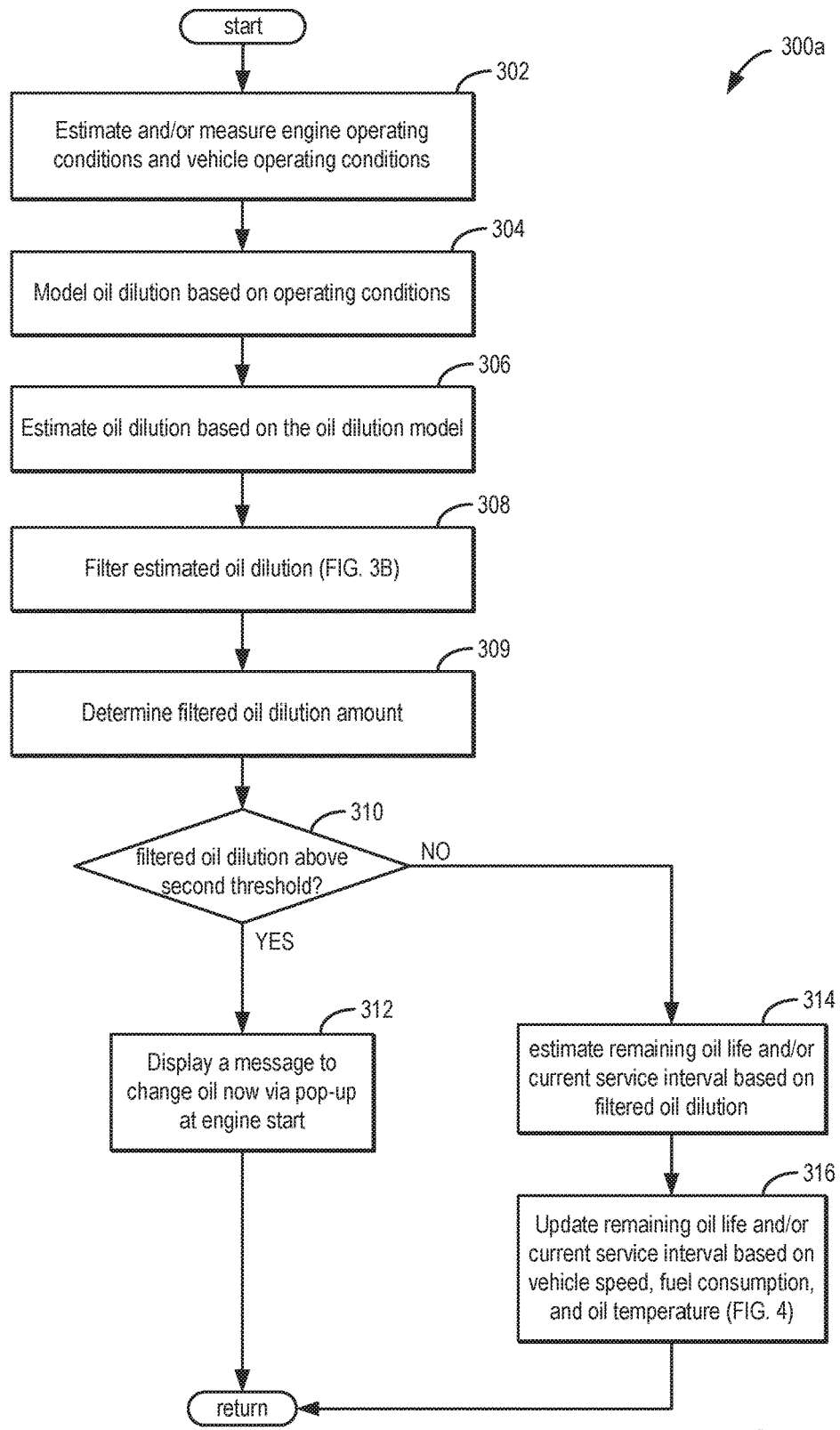
FIG. 3A illustrates an example operating method for estimating a current service interval based on oil wear.
Figure 3B:
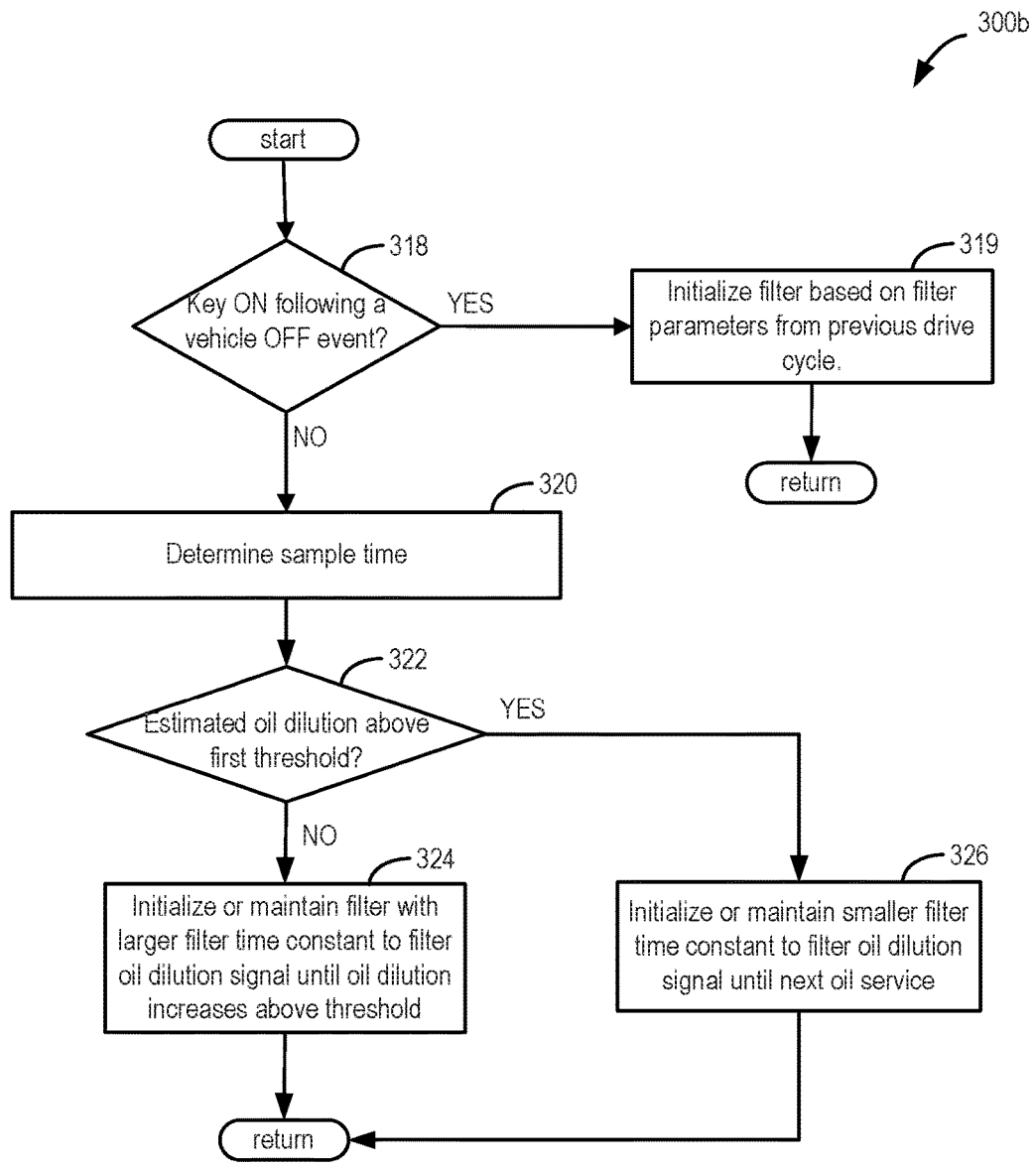
FIG. 3B illustrates an example operating method for filtering an estimated oil dilution amount.

Turning now to FIG. 3A, it shows an example routine 300a, which illustrates a method for estimating a current service interval based on an oil dilution amount. In one example, the current service interval may be a duration of vehicle operation remaining until next oil change (e.g., a number of days). In another example, the current service interval may be a distance until next oil change (e.g., a number of miles). Method 300a will be described in reference to the system described in FIGS. 1 and 2, though it should be understood that method 300a may be applied to other systems without departing from the scope of this disclosure. Method 300a may be carried out by a controller (e.g., controller 48 of FIG. 1), and may be stored as executable instructions in non-transitory memory. Instructions for carrying out method 300a and other method discussed herein may be executed by a controller, such as controller 48 of FIG. 1, based on instructions stored on a memory of the controller and in conjunction with signals received from various sensors, such as the sensors described above with reference to FIGS. 1 and 2. The controller may employ engine actuators of the engine system to adjust engine operation, and/or vehicle actuators of the vehicle system to adjust vehicle operation and/or provide an indication of oil degradation via a human-machine interface according to method 300a described below.

Method 300a begins at 302. At 302, method 300a includes estimating and/or measuring one or more engine operating conditions and vehicle operating conditions. Engine operating conditions may include an ambient temperature, an engine temperature, an engine speed, an engine load, an injection pressure, an injection timing, a duration of engine operation, an engine air-to-fuel ratio, etc. Vehicle operating conditions may include vehicle speed, a number of DPF regeneration events, fuel consumption, etc. As such, vehicle speed may be determined by the controller based on an output from a vehicle speed sensor coupled to the vehicle and communicating with the controller; and fuel consumption may be determined by the controller based on an indication from a fuel usage sensor. Upon determining the vehicle operating conditions, method 300a proceeds to 304.

At 304, method 300a includes determining an oil dilution model based on the operating conditions. In one example, the oil dilution model may be based on a difference between a commanded air-to-fuel ratio and an engine air-to-fuel ratio as determined from an exhaust sensor. The commanded air-to-fuel ratio may be determined based on an amount of fuel injection determined by the engine controller to maintain the exhaust gas products at stoichiometric conditions. The engine air-to-fuel ratio may be determined based on a reading from the exhaust UEGO sensor (e.g., sensor 64 at FIG. 1).

For example, during cold start conditions, when it is determined that the controller is commanding more fuel to maintain the engine air-to-fuel ratio at stoichiometry, it may be inferred that the fuel is lost to the oil pan by passing the piston rings. Accordingly, when the commanded air-to-fuel ratio is richer than stoichiometry and the exhaust sensor based engine air-to-fuel ratio is at stoichiometry, an oil dilution amount may be increased. The amount of increase may be based on the integrated difference between the commanded air-to-fuel ratio and the engine air-to-fuel ratio as determined via the exhaust oxygen sensor. Likewise, when the controller is commanding less fuel to maintain the engine air-to-fuel ratio at stoichiometry, it may be inferred that excess fuel (to maintain stoichiometric engine air-to-fuel ratio) may come from the PCV system. Accordingly, the oil dilution amount may be decreased. The amount of decrease may be based on the integrated difference between the commanded air-to-fuel ratio and the engine air-to-fuel ratio.

In another example, the oil dilution model may be based on a duration of engine operation and a fuel injection timing. For example, during engine operation in a warm state (e.g., engine temperature may be at or greater than a threshold temperature, catalyst may be at or greater than a catalyst light-off temperature, etc.), the controller may determine if late fuel injection was carried out at one or more cylinders since engine start. As such, late fuel injections may be performed during a cold start condition to improve particulate emissions. In other words, the start of fuel injection timing during cold start operations may be retarded from start of fuel injection timings when engine is not operating in cold start conditions. However, late fuel injection may increase dilution of oil in the crankcase. Therefore, if late fuel injection was performed since engine start, the controller may determine if a duration of engine operation in the warm state is greater than a threshold duration. The threshold duration may be based on an amount of fuel that was injected late since engine stop. For example, it may take a duration of time with engine operating in warm conditions after cold-start to combust the excess fuel in the PCV system (excess fuel in the PCV system may be due to late fuel injection timings utilized during the cold start to reduce particulate matter and particle number emissions). Therefore, if the duration of engine operation in the warm state is greater than the threshold duration, excess fuel in the PCV system may be combusted. Consequently, the oil dilution amount may be reduced. However, if it is determined that the duration of engine operation is not greater than the threshold duration, excess fuel in the PCV system may not be combusted. As a result, oil dilution amount may not be decreased.

As such, an amount by which the oil dilution amount may be increased or decreased when engine is not operating in cold start conditions may be based on a duration of engine operation in the warm state, and an amount of fuel injected with late fuel injection. For example, the amount of increase of oil dilution amount may increase as the duration of engine operation in the warm state decreases. Further, the amount of increase of oil dilution amount may increase with an increase in the amount of fuel injected late. Similarly, the amount of decrease of oil dilution amount may increase as the duration of engine operation in the warm state increases, and as the amount of fuel injected late decreases.

In another example, the oil dilution amount may be based on driving style and a number of regeneration events of a diesel particulate filter. For example, DPF regeneration events result in post fuel injections, which spray diesel onto the cylinder walls. As a result, a portion of fuel may entrain into the oil. Consequently, the oil dilution amount may increase. However, during highway driving conditions, lighter fractions of the entrained oil may evaporate, causing the oil dilution amount to decrease.

Next, at 306, an oil dilution amount may be estimated based on the oil dilution model. For example, the oil dilution model may be applied to an oil quality monitor to obtain an estimated oil dilution amount.

In one example, when it is determined that the controller is commanding more fuel to obtain a stoichiometric engine air-to-fuel ratio, the oil quality monitor maintaining a current oil dilution amount may be adjusted by incrementing the oil dilution amount. The amount of increase may be based on the difference between the commanded air-to-fuel ratio and the engine air-to-fuel ratio. As the difference between the commanded air-to-fuel ratio and the engine air-to-fuel ratio increases, the amount of increase of oil dilution amount may increase.

In another example, when it is determined that the controller is commanding less fuel to maintain the engine air-to-fuel ratio at stoichiometry, the oil quality monitor maintaining a current oil dilution amount may be adjusted by decreasing the oil dilution amount.

In still another example, when the commanded air-to-fuel ratio and the engine air-to-fuel ratio are at stoichiometry, it may be inferred that there is no fuel in the oil. That is, oil dilution may be zero.

In yet another example, during a vehicle cold start, a cold start oil dilution quality score may be generated based on the modeled oil dilution. Subsequently, a rolling average of a cold start oil dilution quality score may be determined, and an estimated oil dilution amount may be obtained based on the rolling average.

Further, in some examples, the oil dilution amount may be based on a sensor measuring oil quantities, such as viscosity.

Upon estimating the oil dilution amount, the routine may proceed to 308. At 308, method 300a includes filtering the estimated oil dilution amount. A filter that allows a sensitivity of the filter to be changed based on the estimated oil dilution amount may be used for the filtering. Accordingly, a single pole low pass filter may be utilized to filter the estimated oil dilution amount. While the present example utilizes a low pass filter, in some examples, a moving average filter (also referred to as rolling average filter) may be utilized to filter the estimated oil dilution amount. In still further examples, an exponentially weighted moving average filter may be utilized to filter the estimated oil dilution amount. The filter may be configured such that the sensitivity of the filter is adjusted based on the estimated oil dilution amount. The sensitivity may be adjusted with a gain-scheduled time constant. For example, the filter may be configured such that at lower estimated oil dilution amounts below a threshold dilution, a larger time constant may be utilized, while at higher estimated oil dilution amounts above the threshold, a smaller time constant may be utilized. By utilizing a larger time, the sensitivity of the filter may be decreased; and by utilizing a smaller time constant, the sensitivity of the filter may be increased. Thus, at lower dilutions, by utilizing the larger time constant, the filter may be made less sensitive to changes in oil dilution estimation, while at higher dilutions, by utilizing the smaller time constant, the filter may be made more sensitive to changes in oil dilution estimation. Details of filtering the estimated oil dilution amount will be discussed further at FIG. 3B below.

Turning to FIG. 3B, an example flow chart illustrating a method 300b for initializing a filter for filtering an estimated oil dilution amount. Method 300b may be performed in coordination with method 300a shown at FIG. 3A. The oil dilution amount may be estimated as discussed at step 306 of method 300a. Further, as discussed with respect to FIG. 3A, the filter may be a moving average filter, an exponentially weighted moving average filter or a low-pass filter. The initialization may be performed during key ON conditions following a vehicle OFF event and/or when an oil dilution condition is met as discussed below.

Method 300b begins at 318. At 318, method 300b may include determining if a key ON event has occurred following a vehicle OFF event. It will be appreciated that vehicle-off conditions may vary based on the configuration of the vehicle system. For example, embodiments of vehicle-off conditions may vary for hybrid-drive enabled vehicle systems, non-hybrid-drive enabled vehicle systems, and push-button engine start-enabled vehicle systems. It will be appreciated, however, that the vehicle-off conditions referred to herein are one-to-one equivalent to engine-off conditions.

Upon determining that a key ON event has occurred following a vehicle OFF condition, method 300b proceeds to 319 at which the filter may be initialized based on values of one or more filter parameters from the previous drive cycle in order to provide a signal at key ON. The filter parameters may include a sample time, which is a period between two sample points, and a filter time constant, which determines a response time of the filter. The values of a latest sample time and a latest filter time constant from a vehicle's drive cycle may be stored in an EEPROM of the controller responsive to a vehicle OFF condition being detected, and therefore, the values for initializing the filter may be retrieved from the EEPROM at next key ON after the vehicle OFF. In this way, during selected key ON events, the filter may be initialized based on last value from the previous drive cycle. Upon initializing the filter, method 300b may return to step 309 described at FIG. 3A.

If the key ON condition at 318 is not satisfied, method 300b may proceed to 320.

At 320, method 300b includes determining a sample time for filtering oil dilution data. The sample time is a period between a two oil dilution data sample points at which the oil dilution data is fed into the filter. That is, the sample time is a duration between a first oil dilution data sample point and a second oil dilution data sample point at which the oil dilution data is filtered. The sample time may be based on a system sample time of the system measuring and/or estimating the values of data input into the filter, for example.

Next, at 322, method 300b includes judging if the estimated oil dilution amount is greater than a first threshold dilution. The first threshold dilution may be utilized as discussed below to select a time constant for filtering the estimated oil dilution amount. The first threshold duration may be based on a duration since the last oil change or service. For example, as the duration increases, the sensitivity of the filter may be increased. As discussed above, the sensitivity of the filter may be increased by decreasing the time constant for the filter. The estimated oil dilution amount may be estimated as discussed at step 306 at FIG. 3A. If the answer at 322 is YES, method 300b proceeds to 326. At 326, upon judging that the estimated oil dilution is greater than the first threshold, method 300b includes initializing the filter with a smaller filter time constant to filter oil dilution if the filter is currently operating with a larger filter constant or the method may maintain using the smaller filter constant. The smaller filter time constant may increase a sensitivity of the filter to changes in oil dilution amount. Therefore, at higher oil dilution levels, the oil dilution amount may be tracked more closely. Once the filter is initialized with the smaller filter constant, the smaller filter constant may be maintained until a vehicle OFF condition or the engine oil is serviced. Upon choosing the smaller filter constant, method 300b may return to step 309 at FIG. 3A. However, at 322, if it is judged that the estimated oil dilution amount is less than the first threshold dilution, method 300b proceeds to 324. At 324, method 300b includes initializing the filter with a larger filter time constant to filter oil dilution. The larger filter time constant may decrease the sensitivity of the filter to changes in oil dilution amount, thereby providing a smoother signal at lower oil dilution amounts. The larger filter constant may be maintained until the estimated oil dilution increased above the first threshold or until a vehicle OFF condition. Upon choosing the larger filter constant at 324, method 300b may return to step 309 at FIG. 3A.

In this way, time constants for the filter may be adjusted based on the estimated oil dilution. By choosing the larger time constant when the estimated oil dilution amount is less than the threshold, a smoother filtered output may be achieved. Consequently, transient dynamics in oil dilution amounts may be filtered out at lower oil dilution amounts. Thus, a remaining oil life calculated based on the oil dilution amount may have less variations at lower oil dilution amounts. Therefore, when the remaining oil life or a current service interval based on the remaining oil life is displayed to a user, transient degradation dynamics are filtered out. However, when the estimated oil dilution amount is greater than the threshold, by choosing a smaller time constant, the filtered output may closely follow changes in the oil dilution amount. The smaller time constant increases the sensitivity of the filter and improves a filter response time. Therefore, latency in delivering the filtered output is reduced and the user may be informed of the need to change oil in a timely manner.

In some examples, such as when a weighted rolling average method is used, a coefficient representing a degree of weighting decrease may be adjusted based on the estimated oil dilution amount. Further, when a weighted rolling average method is used, a number of samples in a window and a sampling rate may be adjusted based on the estimated oil dilution amount.

In some other examples, in addition to adjusting the filter constant based on the oil dilution amount, the filter constant may be selected based on a variance of a threshold number of samples. For example, for the variance greater than a threshold variance, the filter constant value may be increased; otherwise, the filter constant value may be decreased. Returning to 309 at FIG. 3A, upon choosing the appropriate filter constant based on estimated oil dilution amounts and determining the sampling time, method 300a includes determining the filtered oil dilution amount. That is, an output of the filter may be determined.

Next, method 300a proceeds to 310 to judge if the filtered oil dilution amount is greater than a second threshold dilution. The second threshold dilution may be greater than the first threshold dilution.

If the filtered oil dilution amount is not greater than the second threshold, method 300a proceeds to 314. At 314, method 300a includes estimating a remaining oil life based on the filtered oil dilution amount. The filtered oil dilution amount may be inversely proportional to the remaining oil life. For example, as the filtered oil dilution amount increases, the remaining oil life may decrease. Further, in some examples, additionally or alternatively, a current service interval may be estimated based on the filtered output. In some examples, the current service interval may be based on the remaining oil life. The current service interval may provide an indication of a distance remaining until next service to change the engine oil. For example, as the oil dilution amount increases, the current service interval may decrease.

In one example, the current service interval may be latched to prevent increases in current service interval except when an engine oil top-up or engine oil change is detected. For example, if a first oil dilution amount at a first time point is greater than a second oil dilution amount at a second later time point, and engine oil service is not detected at the second time point, the current service interval at the second time point may take the value of the current service interval at the first time point. That is, the value of the current service interval may not be increased unless engine oil top-up or engine oil change is detected. In this way, transient increases in current service interval due to transient decreases in oil dilution amount may not be indicated to the vehicle operator.

Next, upon estimating the remaining oil life and/or the current service interval, method 300a proceeds to 316. At 316, method 300a includes updating the remaining oil life and/or the current service interval based on a vehicle speed, fuel consumption, and oil temperature during a threshold driving distance. Specifically, an oil wear monitor may maintain the current service interval or the remaining oil life. The oil wear monitor may be updated based on the vehicle speed, fuel consumption, and oil temperature to account for the effect of driving style on oil wear in addition to oil dilution. The updating may also take into account engine oil fill ups and soot in oil amount. Therefore, oil wear or degradation and hence, the current service interval, may be based on multiple factors including 1) fuel in oil dilution indicated by the filtered oil dilution amount; 2) driving style indicated by vehicle speed, fuel consumption and oil temperature; 3) engine oil service or change; and 4) soot in oil amount. Details of updating the current service interval will be described with respect to FIG. 4.

Returning to 310, if the filtered oil dilution amount is greater than the second threshold, method 300a proceeds to 312. At 312, method 300a includes displaying a message to change oil to a user via a pop-up message. Specifically, the controller may send a signal to a human-machine interface, such as vehicle display 124, to display the pop-up message at next engine start. The pop-up may be clearable by the user.

Figure 4:
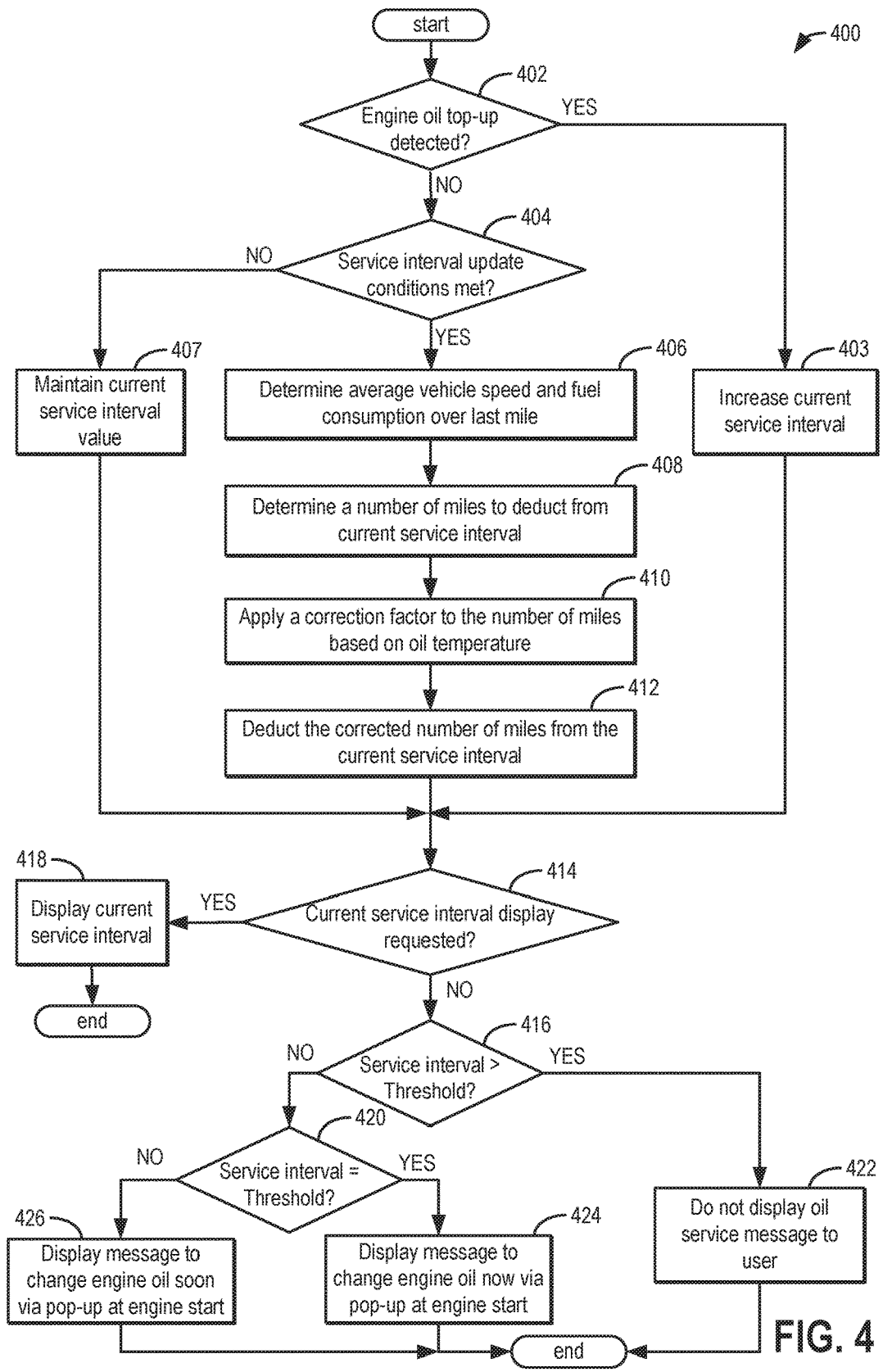
FIG. 4 illustrates an example operating method for updating the current service interval and displaying the current service interval.

Turning to FIG. 4, a flow chart illustrating an example method 400 for updating the current service interval that may be displayed to a user is shown. Method 400 may be performed by a controller, such as controller 48 shown at FIG. 1. Method 400 may be performed in coordination with method 300a shown at FIG. 3A.

Method 400 begins at 402. At 402, method 400 includes judging if an engine oil service is detected. Engine oil service may include an engine oil top-up condition or an oil change condition. The engine oil service may be determined based on an output from an oil level sensor, such as sensor 40 at FIG. 1. If the answer at 402 is YES, method 400 proceeds to 403. At 403, method 400 includes increasing the current service interval by a threshold interval. If engine oil service is not detected, method 400 proceeds to 404. At 404, method 400 includes determining if a service interval update is due. For example, it may be determined if a threshold duration or a threshold driving distance has elapsed since last update. In one example, the threshold driving distance may be one mile. In that case, the service interval update may be performed every one mile.

At 404, if the service interval update is not due, method 400 proceeds to 407. At 407, method 400 includes maintaining a current service interval value that was updated during the latest update. That is, between a first time point when the service interval was last updated and a second time point of next service interval update, the updated value of the service interval at the first time point may be maintained.

At 404, if the service interval update is due, method 400 proceeds to 406. At 406, method 400 includes determining an average vehicle speed and fuel consumption during the threshold driving distance or duration. Based on the average vehicle speed and fuel consumption, at 408, a number of miles to deduct from the current service interval may be determined. For example, the controller may utilize a look-up table to determine the number of miles to deduct from the current service interval. An example look-up table is shown below at Table 4.1.

TABLE 4.1

|  | Fuel consumption in miles per gallon during threshold duration | | |
|---|---|---|---|
|  | 1 | 10 | 20 |
| Average vehicle speed in miles per hour | 1 | 5 | 3 | 2 |
|  | 20 | 3 | 2 | 1.5 |
|  | 40 | 2 | 1.5 | 1 |

As an example, during the threshold duration, if the fuel consumption is 10 miles per gallon and the average vehicle speed is 20 miles per hour, the number of miles to deduct from the current service interval may be 2.

Next, upon determining the number of miles, method 400 proceeds to 410. At 410, method 400 includes applying a correction factor to the number of miles based on an engine oil temperature. The correction factor may be determined based on a second look-up table. An example second look-up table is shown below at Table 4.2.

TABLE 4.2

| Average Oil temperature | Correction factor |
|---|---|
| −40 | 3 |
| 10 | 2 |
| 30 | 1.5 |
| 90 | 1 |
| 125 | 1 |
| 150 | 3 |

As an example, during the threshold duration, if the average oil temperature is determined to be 30 Celsius, the correction factor may be 1.5. Upon determining the correction factor, the correction factor may be applied by multiplying the number of miles determined at 408 with the correction factor determined at 410 to obtain the corrected number of miles.

Next, at 412, method 400 includes deducting the corrected number of miles from the current service interval to obtain an updated service interval. The updated service interval is then stored as the current service interval. In this way, by taking into account the fuel consumption and vehicle speed, the effect of driving style on oil degradation may be determined and current service interval may be updated accordingly. In some examples, in addition to driving style and oil dilution, an amount of soot in oil may be utilized to update current service interval. Next, method 400 proceeds to 414. At 414, method 400 includes determining if a user has requested display of current service interval. If the answer at 414 is YES, method 400 proceeds to 418. At 418, method 400 includes displaying the current service interval. For example, the user may select an option included within a pull down menu to display the current service interval on a HMI.

Further, in one example, the current service interval may be displayed in calibrated steps based on the current service interval. For example, when the current service interval is above a first threshold interval a first step size may be used. As an example, 5,000 kilometer step size may be used until the current service interval reaches 10,000 kilometers. That is, a first current service interval displayed may be 25,000 kilometers, a second current service interval displayed may be 20,000 kilometer, a third current service interval may be 15,000 kilometers and a fourth current service interval displayed may be 10,000 kilometers. Below the first threshold interval and above a second threshold interval (the second threshold interval less than the first threshold interval), a second step size less than the first step size may be used. For example, 1,000 kilometer step size may be used until the distance reaches 1000 kilometer. As an example, a fifth current service interval displayed may be 9,000 kilometers, a sixth current service interval displayed may be 8,000 kilometers and so on until 1,000 kilometer is reached. Once the second threshold interval is reached, a third step size less than the second step size may be used. For example, once 1000 kilometer interval is reached, the current service interval may be decreased every one kilometer.

If the answer at 414 is NO, method 400 proceeds to 416. At 416, method 400 includes determining if the current service interval is greater than a threshold interval. If the current service interval is not greater than the threshold interval, method 400 proceeds to 420. At 420, method 400 includes determining if the service interval has reached the threshold. If YES, at 424, a message to change engine oil may be displayed to a user via a human-machine interface, such as display 124 at FIG. 1. In one example, the message may be "oil change required". Additionally, in some examples, the current service interval may be displayed. However, if the service interval is below the threshold, at 426, a message to change oil soon may be displayed to the user. Additionally, in some examples, the current service interval may be displayed. The messages "change oil now" or "change oil soon" and/or the current service interval may be displayed via a pop-up menu at each engine start.

Retuning to 416, if the current service interval is not selected for display by the user and the current service interval is greater than the threshold, the current service interval or the messages may not be displayed to the user.

The method may subsequently end.

FIG. 5 shows a graph 500 illustrating an example adjustment of a filter constant for filtering an oil dilution amount data based on the oil dilution amount. Graph 500 is plotted with filter constant values along y-axis and oil dilution amount along x-axis. The filter constant values increase along the direction of y-axis and the oil dilution amount increases along the direction of x-axis. Graph 500 includes plot 510, which shows changes in filter constant values with respect to the oil dilution amount. Vertical line 520 indicates a first threshold oil dilution amount and vertical line 530 indicates a second threshold oil dilution amount.

The oil dilution amount may provide an estimate of a concentration of fuel in oil. Thus, the oil dilution amount be an estimated oil dilution amount determined based on an oil dilution model, as discussed with respect to FIG. 3A. Briefly, the oil dilution amount may be estimated based one or more of an integrated difference between the commanded air-to-fuel ratio and the engine air-to-fuel ratio, a duration of engine operation, a fuel injection timing, a driving style, and a number of regeneration events of a diesel particulate filter.

As indicated at plot 510, when the oil dilution amount is at or less than the first threshold 520, a larger filter constant value may be utilized for filtering the oil dilution amount. The larger filter time constant may be implemented to filter out large variations and slow the filter response. Said another way, the larger filter time constant may be utilized to reduce a sensitivity of the filter, and hence an amount of filtering may be increased. As a result, variations in the estimations of a remaining distance and/or duration until next service may be reduced when the oil dilution amount (that is, fuel in oil concentration) is below the first threshold.

Between the first threshold 520 and the second threshold 530, the filter constant value may be decreased linearly with respect to the oil dilution amount until the second threshold 530 is reached.

At and above the second threshold 530, a smaller filter constant value may be utilized for filtering the oil dilution amount. The smaller filter time constant may allow the filter to respond more quickly to the oil dilution estimations, and the estimated oil dilution amount and the filtered output may be consistent. Therefore, the amount of filtering may decrease with decrease in time constant values. Accordingly, when the oil dilution amount in greater than the second threshold, variations in oil dilution amounts may be tracked more closely in order to enable a controller to provide an indication to a user to change oil when the oil dilution amount increases above a third threshold (not shown).

In some embodiments, a single threshold oil dilution amount may be utilized instead of two thresholds. In such cases, when the oil dilution amount is below the single threshold, the large filter constant may be applied for filtering the oil dilution amount; otherwise the smaller filter constant may be applied to the filter.

In this way, the estimated oil dilution data may be passed through a filter, and a time constant for the filter may be configured based on the estimated oil dilution amount such that at lower dilutions, the filter is less sensitive to variations in the oil dilution amounts, and at higher dilutions, the filter is more sensitive to the variations.

Further, in some examples, in addition to adjusting the time constant for the filter, a sampling time for the filter may be adjusted based on the estimated oil dilution amount. This again, may allow the filter to be more sensitive since the values may be updated more quickly.

FIG. 6 shows a graph 600 illustrating an example decay of filtered signal based on a time constant of the filter during a period between two sampling times. Graph 600 is plotted with filtered signal along y-axis and time along x-axis. Graph 600 includes plot 610, which shows change in filtered signal when a time constant for the filter is one. Graph 600 further includes plot 620, which shows change in filtered signal when the time constant is set to a first larger value; and plot 630, which shows change in filtered signal when the time constant is set to a second smaller value. Time point t0 is a first sample time at which the signal (that is, the estimated oil dilution amount) is input into the filter. The filtered signal is maintained in its current value for a minimum duration until t1. Time period between t1 and t2 is the duration between sample times during which the filter may allow the signal to decay.

As depicted, when a larger filter constant is utilized (plot 620), the filter allows the signal to decay at a slower rate than when a smaller filter constant (plot 630) is utilized. Thus, based on the time period between samples, a filter constant value may be adjusted. For example, if the sample time is long (that is, slower sampling times), the filter may have more time to decay between samples and therefore, the time constant value may be increased. Further, if the sample time is short, the filter may not have sufficient time to decay and therefore, the time constant value may be decreased. In this way, a balance between the sample time and the time constant is adjusted to allow sufficient time for the signal to decay correctly.

Turning to FIG. 7, a graph 700 showing an example filter output of the oil dilution amount is illustrated. Specifically, graph 700 shows estimated oil dilution amount at plot 710, filtered oil dilution amount after passing through a filter at 720, and a threshold oil dilution amount at 730. The graph is plotted with oil dilution amount along y-axis, and time along x-axis.

Between time t0 and t1, the estimated oil dilution amount is below the threshold 730. Therefore, a larger filter time constant may be utilized to filter the estimated oil dilution amount. Responsive to utilizing the larger filter time constant, the filter response may be slower and hence, may filter out large variations in the estimated oil dilution amount. As a result, a filtered output that has lesser variations than the input signal may be obtained at lower oil dilution amounts. By utilizing the larger filter time constant at lower oil dilutions, the sensitivity of the filter may be decreased, which enables the filter to deliver an output with lesser variations. At time t1 and beyond, the estimated oil dilution may be at or above the threshold. Therefore, a smaller filter time constant may be utilized to filter the estimated oil dilution amount. Responsive to utilizing the smaller filter time constant, the filter response may be faster and hence, the filtered output may closely follow the input signal. By utilizing the smaller filter time constant at higher oil dilutions, the sensitivity of the filter may be increased, which enables the filter to react quickly to variations in estimated oil dilutions. As a result, latency in output signal is reduced and thus, latency in delivering the oil dilution information when oil dilution levels are near the limit is reduced.

In some examples, the adjustment of filter time constant values may be based on a duration or distance travelled (e.g., as determined by an indication by an odometer coupled to the vehicle) since last oil service or oil change in addition to estimated oil dilution amount. For example, the larger filter time constant may be utilized when the estimated oil dilution amount is below a threshold and the distance since last oil service is less than a threshold distance. However, when the estimated oil dilution is greater than the threshold and/or when the distance since last oil service is greater than the threshold distance, the smaller filter time constant may be utilized. The additional condition based on the duration since oil change may prevent unnecessary change in filter time constants due to variations in oil dilution amounts at higher oil dilutions.

In another example, prior to the oil dilution reaching a first threshold, a first larger time constant may be utilized. Between the first threshold and a second threshold that is greater than the first threshold, the time constant may be linearly decreased with time until a second smaller time constant is reached and/or until the second threshold dilution is reached. Beyond the second threshold, the second smaller time constant may be utilized.

As one embodiment, a method for a vehicle engine includes determining a filtered oil dilution amount by filtering an estimated oil dilution amount of an engine oil; and indicating oil degradation based on the filtered oil dilution amount; wherein an amount of filtering is adjusted based on the estimated oil dilution amount. A first example of the method includes wherein adjusting the amount of filtering includes responsive to the estimated oil dilution amount below a first threshold amount, increasing the amount of filtering; otherwise, decreasing the amount of filtering. A second example of the method optionally includes the first example and further includes wherein increasing the amount of filtering includes implementing a larger filter time constant for the filtering; and wherein decreasing the amount of filtering includes implementing a smaller filter time constant for the filtering. A third example of the method optionally includes one or more of the first and second examples, and further includes responsive to an oil change, implementing the lower filter time constant for the filtering. A fourth example of the method optionally includes one or more of the first through third examples, and further includes, wherein indicating oil degradation includes responsive to the filtered oil dilution amount above a second threshold amount, providing an indication to a user via a human-machine interface of the vehicle, the indication comprising a request to change engine oil; and wherein, the second threshold amount is greater than the first threshold amount. A fifth example of the method optionally includes one or more of the first through fourth examples, and further includes, wherein indicating oil degradation includes estimating a percentage of oil life remaining based on the filtered oil dilution amount, an average vehicle speed over a threshold driving distance, a fuel consumption rate over the threshold distance, and an engine oil temperature. A sixth example of the method optionally includes one or more of the first through fifth examples, and further includes, displaying a remaining distance to oil change in calibrated steps based on the percentage of oil life remaining and wherein displaying the remaining distance to oil change in calibrated steps includes utilizing a first step size until a first distance threshold is reached; utilizing a second step size smaller than the first step size between the first distance threshold and a second distance threshold; and utilizing a third step size smaller than the second step size at and after the second distance threshold. A seventh example of the method optionally includes one or more of the first through sixth examples, and further includes, adjusting the amount of filtering based on a period between two samples. An eighth example of the method optionally includes one or more of the first through seventh examples, and further includes, wherein adjusting the amount of filtering based on the period includes increasing the filter time constant as the period increases. A ninth example of the method optionally includes one or more of the first through eighth examples, and further includes, wherein the oil dilution is estimated based on a number of regeneration events of a diesel particulate filter located in an exhaust of the engine.

As another embodiment, a method for an engine includes estimating a fuel in oil dilution; using the estimated fuel in oil dilution as an input to a filter; and responsive to the estimated fuel in oil dilution less than a threshold dilution, selecting a first time constant for the filter; otherwise, selecting a second time constant for the filter; wherein the first time constant is larger than the second time constant. A first example of the method includes determining a distance to service based on an output of the filter. A second example of the method optionally includes the first example and further includes wherein the distance to service is further based on a vehicle speed, a vehicle mileage, and an average oil temperature during a threshold distance of vehicle operation; and further comprising, responsive to the distance to service greater than a threshold distance, indicating engine oil degradation to a user via a display within the vehicle at engine start-up. A third example of the method optionally includes one or more of the first and second examples, and further includes indicating the distance to service via the display based on a user request. A fourth example of the method optionally includes one or more of the first through third examples, and further includes, wherein the filter is a single pole low pass filter. A fifth example of the method optionally includes one or more of the first through fourth examples, and further includes, responsive to the estimated fuel in oil dilution less than the threshold dilution and a period between two samples for the filter less than a threshold period, decreasing the first time constant but maintaining the first time constant above the second time constant; and responsive to the estimated fuel in oil dilution greater than the threshold dilution and the period between two samples for the filter greater than a second threshold period, increasing the second time constant but maintaining the second time constant below the first time constant. A sixth example of the method optionally includes one or more of the first through fifth examples, and further includes, wherein the fuel in oil dilution is estimated based on a duration of engine operation and a fuel injection timing.

As another embodiment, a method for a vehicle includes at a controller within the vehicle, estimating an amount of fuel in engine oil based on a number of regeneration events of a diesel particulate filter within an exhaust of the vehicle, a vehicle speed and a vehicle mileage; generating a filtered amount of fuel in engine oil by filtering the estimated amount of fuel in engine oil; estimating an oil degradation amount based on the filtered amount of fuel in engine oil; and generating a message to display an oil service interval, the oil service interval based on the oil degradation amount; wherein, a sensitivity of the filtering is adjusted based on the estimated amount of fuel in engine oil. A first example of the method includes wherein the filtering includes a low-pass filtering and wherein, adjusting the sensitivity of the filtering includes decreasing the sensitivity by utilizing a first larger time constant for the filtering when the estimated amount of fuel in engine oil is below a first threshold; otherwise increasing the sensitivity by utilizing a second smaller time constant for the filtering. A second example of the method optionally includes the first example and further includes responsive to the filtered amount of fuel in engine oil greater than a second threshold amount, generating a message to display at next engine start at a human-machine interface within the vehicle, the message including a request to a user to replace engine oil; and wherein the second threshold amount is greater than the first threshold amount.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle engine, comprising:
with a vehicle engine controller,
determining a filtered oil dilution amount by filtering, with the controller, an estimated oil dilution data value of an engine oil; and
indicating oil degradation based on the filtered oil dilution amount,
wherein an amount of filtering is adjusted by adjusting a filter time constant of a filter within the controller based on the estimated oil dilution data value, and
wherein the estimated oil dilution data value is based on a number of regeneration events of a particulate filter within an exhaust of a vehicle, a vehicle speed indication from a vehicle speed sensor, and a vehicle mileage from a fuel usage sensor; and
generating a message to display an oil service interval, the oil service interval based on the filtered oil dilution amount.

2. The method of claim 1, wherein adjusting the amount of filtering includes, responsive to the estimated oil dilution data value below a first threshold amount, increasing the amount of filtering; otherwise, decreasing the amount of filtering.

3. The method of claim 2, wherein increasing the amount of filtering includes implementing a larger filter time constant for the filtering, and wherein decreasing the amount of filtering includes implementing a smaller filter time constant for the filtering.

4. The method of claim 3, further comprising, responsive to an oil change, implementing the smaller filter time constant for the filtering.

5. The method of claim 3, wherein indicating oil degradation includes, responsive to the filtered oil dilution amount above a second threshold amount, providing an indication to a user via a human-machine interface of the vehicle, the indication comprising a request to change engine oil; and wherein the second threshold amount is greater than the first threshold amount.

6. The method of claim 1, wherein indicating oil degradation includes estimating a percentage of oil life remaining based on the filtered oil dilution amount, an average vehicle speed over a threshold driving distance, a fuel consumption rate over the threshold distance, and an engine oil temperature.

7. The method of claim 6, further comprising displaying a remaining distance to oil change in calibrated steps based on the percentage of oil life remaining and wherein displaying the remaining distance to oil change in calibrated steps includes utilizing a first step size until a first distance threshold is reached; utilizing a second step size, smaller than the first step size, between the first distance threshold and a second distance threshold; and utilizing a third step size, smaller than the second step size, at and after the second distance threshold.

8. The method of claim 1, further comprising adjusting the amount of filtering based on a period between two samples.

9. The method of claim 8, wherein adjusting the amount of filtering based on the period includes increasing the filter time constant as the period increases.

10. The method of claim 1, wherein the oil dilution data value is estimated based on a number of regeneration events of a diesel particulate filter located in an exhaust of the engine.

11. A method for an engine, comprising:
via an engine controller,
estimating a fuel in oil dilution data value;
using the estimated fuel in oil dilution data value as an input to a filter; and
responsive to the estimated fuel in oil dilution data value less than a threshold dilution, selecting a first time constant for the filter; otherwise, selecting a second time constant for the filter,
wherein the first time constant is larger than the second time constant, and
wherein the filter is a single pole low pass filter; and
generating a message to display an oil service interval, the oil service interval based on the filtered fuel in oil dilution.

12. The method of claim 11, further comprising determining a distance to service based on an output of the filter.

13. The method of claim 12, wherein the distance to service is further based on a vehicle speed, a vehicle mileage, and an average oil temperature during a threshold distance of vehicle operation; and further comprising, responsive to the distance to service greater than a threshold distance, indicating engine oil degradation to a user via a display within a vehicle at engine start-up.

14. The method of claim 13, further comprising indicating the distance to service via the display based on a user request.

15. The method of claim 11, further comprising, responsive to the estimated fuel in oil dilution data value less than the threshold dilution and a period between two samples for the filter less than a threshold period, decreasing the first time constant but maintaining the first time constant above the second time constant; and, responsive to the estimated fuel in oil dilution data value greater than the threshold dilution and the period between two samples for the filter greater than a second threshold period, increasing the second time constant but maintaining the second time constant below the first time constant.

16. The method of claim 11, wherein the fuel in oil dilution data value is estimated based on a duration of engine operation and a fuel injection timing.

17. A method for a vehicle, comprising:
at a controller within the vehicle,
estimating an amount of fuel in engine oil based on a number of regeneration events of a particulate filter within an exhaust of the vehicle, a vehicle speed, and a vehicle mileage;
generating a filtered amount of fuel in engine oil by filtering the estimated amount of fuel in engine oil;
estimating an oil degradation amount based on the filtered amount of fuel in engine oil; and
generating a message to display an oil service interval, the oil service interval based on the oil degradation amount,
wherein a sensitivity of the filtering is adjusted by implementing different time constants based on the estimated amount of fuel in engine oil.

18. The method of claim 17, wherein the filtering includes low-pass filtering, and wherein adjusting the sensitivity of the filtering includes decreasing the sensitivity by utilizing a first larger time constant for the filtering when the estimated amount of fuel in engine oil is below a first threshold amount; otherwise, increasing the sensitivity by utilizing a second smaller time constant for the filtering.

19. The method of claim 17, further comprising, responsive to the filtered amount of fuel in engine oil greater than a second threshold amount, generating a message to display at next engine start at a human-machine interface within the vehicle, the message including a request to a user to replace engine oil, wherein the second threshold amount is greater than a first threshold amount.

* * * * *